United States Patent
Olsen et al.

[15] 3,695,295
[45] Oct. 3, 1972

[54] ROTARY INPUT/FEEDBACK MECHANICAL SERVO VALVE

[72] Inventors: Benny Olsen, Plainville; Zenny Olsen, Southington, both of Conn.

[73] Assignee: Allied Control Company Incorporated, Plantsville, Conn.

[22] Filed: Sept. 24, 1970

[21] Appl. No.: 75,088

[52] U.S. Cl. ..................................... 137/625.69
[51] Int. Cl. ............................................. F17d
[58] Field of Search ....... 137/625.69, 625.48, 625.66; 251/215; 74/57, 89.14; 91/368

[56] References Cited

UNITED STATES PATENTS

| | | |
|---|---|---|
| 3,218,937 | 11/1965 | Dettlof ..................... 91/368 |
| 3,292,499 | 12/1966 | Duffy ........................ 91/368 |
| 1,908,396 | 5/1933 | Albright ............ 137/625.69 X |
| 2,833,253 | 5/1958 | Wittren ................ 137/625.66 |

*Primary Examiner*—M. Cary Nelson
*Assistant Examiner*—Robert J. Miller
*Attorney*—Kenneth B. Hamlin

[57] ABSTRACT

A rotary input/feedback mechanical servo valve is disclosed which comprises a four-way linear motion spool valve, the spool of which is coupled to the rotary input shaft through a rotary-to-linear translator and to the rotary feedback shaft through a universal coupler so that rotary motion input and rotary motion feedback are translated into linear movement of the spool.

5 Claims, 3 Drawing Figures

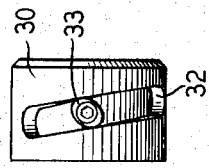
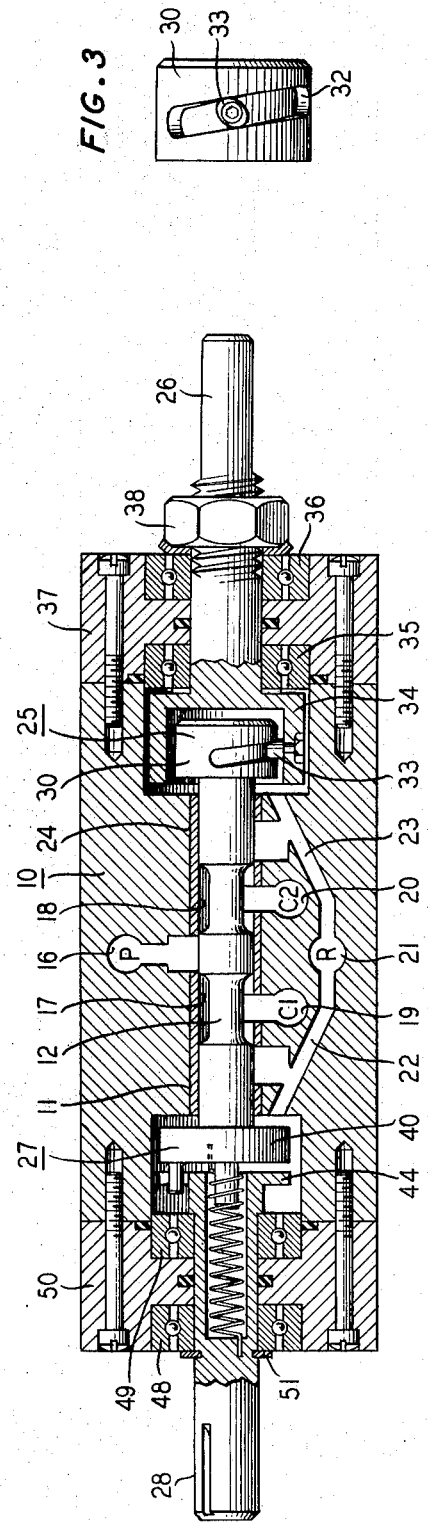
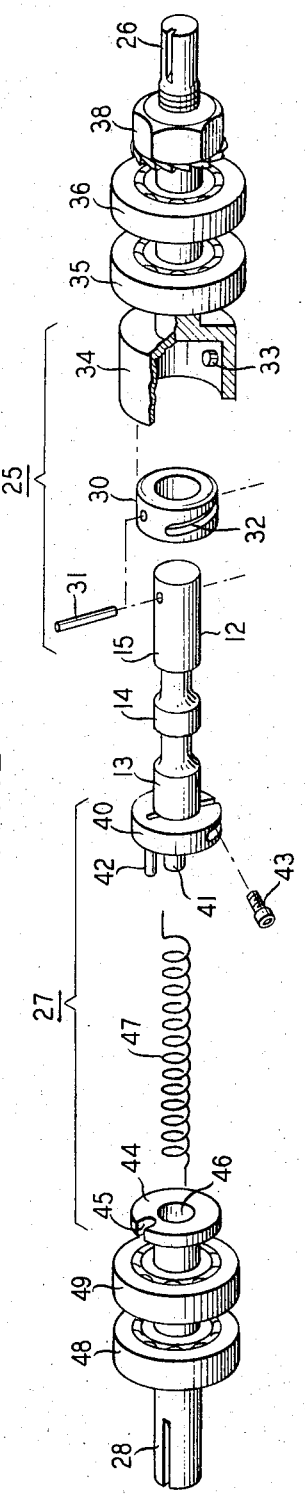
INVENTORS
Z. OLSEN
B. OLSEN

ROTARY INPUT/FEEDBACK MECHANICAL SERVO VALVE

FIELD OF THE INVENTION

The present invention relates to servo valves, and more particularly to rotary input/feedback mechanical servo valves.

BACKGROUND OF THE INVENTION

Rotary servo valves are well known and are utilized to control fluid motors or rotary actuators where control input and feedback shafts are driven by common mechanical devices such as gears, sprockets, racks, or synchros. Such valves have a number of disadvantages. Porting within the valves is generally controlled by the rotary action of a combined shaft/metering valve construction. The prime disadvantage of this principle of valve construction is that several critically located pressure seals are required to create nonleaking pressure barriers between the rotary elements and the valve body. Because these seals are acted upon by hydraulic pressure and generally are of an elastomer type, the "stiction" on the adjacent moving parts is high. Furthermore the positioning of the rotary elements with respect to the valve body ports is critical and requires costly manufacturing techniques. An additional disadvantage of rotary valves of the type known in the prior art is that the pressure gain characteristics are relatively low. Consequently, the resultant combination of low pressure gain and stiction from the use of elastomer seals causes a discernible deadband or deadzone wherein rotary input motion of the input or feedback shaft produces zero output flow change. This deadband introduces an error of nonrepeatability which is most critical in servo applications in the operation of machine tools, for example, where repeatability is a critical factor.

SUMMARY OF THE INVENTION

It is an object of the present invention to overcome the above-described difficulties and disadvantages of the rotary servo valves of the prior art.

It is a further object of the present invention to effectively eliminate the deadband wherein rotary input motion of the input shaft produces zero flow change.

It is also an object of this invention to provide a rotary servo valve with infinite resolution (sensitivity) so that the mechanism which is controlled thereby may have finite repeatability.

It is a further object of the invention to reduce the cost of manufacturer and concomitantly increase the reliability of rotary servo valves.

The foregoing and other objects are obtained in an illustrative embodiment of a rotary input and rotary feedback mechanical servo valve in accordance with the present invention which comprises a four-way linear motion spool valve, the spool of which is coupled to the rotary input shaft through a rotary-to-linear translator and to the rotary feedback shaft through a universal coupler so that rotary motion input and rotary motion feedback are translated into linear movement of the spool.

In accordance with one feature of the present invention, the rotary-to-linear translator comprises a cam arrangement. In accordance with this aspect of this invention, a single U-shaped cam groove is provided in the surface of a cylindrically shaped member secured to the spool. The sidewalls of this groove act as cam surfaces and cooperate with a cam driver which is fixed to the input shaft. When the input shaft is rotated the cam driver operating against the cam surfaces causes linear movement of the spool. In accordance with another aspect of the present invention, the cam driver is elliptically shaped and is rotatable within the cam groove to provide minimum clearance between the cam driver and cam surfaces to reduce backlash to a minimum.

It is also a feature of the present invention that the rotary feedback motion applied to the feedback shaft be translated into linear movement of the spool by the same rotary-to-linear translator coupled to the input shaft of the valve.

It is a further feature of the invention that an antibacklash spring operate in the linear mode to minimize backlash in the rotary-to-linear translator at the input shaft of the valve and at the same time operate in the torsional mode to minimize backlash in the universal coupler at the feedback end of the valve.

DESCRIPTION OF THE DRAWING

The foregoing and other objects and features of the present invention will be more readily understood from the detailed description of an illustrative embodiment thereof when read with reference to the accompanying drawing in which:

FIG. 1 is a sectional view of the valve of the present invention;

FIG. 2 is an exploded view of the operative components of the valve of the present invention; and FIG. 3 is an enlarged view showing the elliptically shaped cam driver in the U-shaped cam groove of the rotary-to-linear translator.

DETAILED DESCRIPTION OF THE INVENTION

The illustrative embodiment of a rotary input/feedback mechanical servo valve in accordance with the present invention as shown in FIGS. 1 and 2 of the drawings will now be described. The valve comprises a valve body 10 which contains a cylindrical bore 11 for accommodating a valve spool 12 having lands 13, 14 and 15 for regulating the flow of pressurized fluid from an intake pressure port 16 through work chambers 17 or 18 to control ports 19 or 20 and to return port 21.

Linear movement of spool 12 serves to apply pressurized fluid to one or the other of control ports 19 or 20 and simultaneously connect the other control port to return port 21 via one of drain passage 22 or 23. Spool 12 is fitted into a sleeve 24 in bore 11 in the manner known in the art so that elastomer seals are not required. Those knowledgeable in the art will recognize the valve elements thus far identified and described as those of a conventional linear motion four-way spool valve.

It is an aspect of the present invention that this conventional linear four-way spool valve be adapted for rotary motion input and rotary motion feedback by the rotary-to-linear translator 25 coupling input shaft 26 to spool 12 and universal coupler 27 coupling the feedback shaft 28 to spool 12.

As shown in the drawing translator 25 is a cam arrangement comprising a cylindrical member 30 secured to the end of spool 12 by pin 31. A U-shaped helical groove 32 is provided in the outer surface of member 30 and extends partially around the cylindrical surface of member 30 at a predetermined angle or pitch. The sidewalls of groove 32 provide cam surfaces to cooperate with cam driver 33 to cause linear movement of spool 12 in response to rotational movement of input shaft 26.

As shown in the drawing the left-hand end of input shaft 26 terminates in a cupped-shaped cylindrical member 34 and cam driver 33 protrudes from the inner surface of member 34. Input shaft 26 is mounted in bearings 35 and 36 in end member 37 and retained therein by locknut 38 to minimize end play. The assembled input shaft 26 and end member 37 are attached to body 10 by suitable machine screws so that member 34 is concentric with member 30 and cam driver 33 extends into groove 32 of member 30 as shown in FIG. 1.

In accordance with an aspect of the invention cam driver 33 is elliptically shaped and may advantageously be adjusted or turned to provide a minimum clearance between the surface of cam driver 33 and the wall surfaces of groove 32. This is illustrated in FIG. 3. Cam driver 33 may be secured to member 34 in any of a number of ways known in the art. For example, as shown in FIG. 1 cam drive 33 extends through the wall of member 34 and is secured thereto by a countersunk nut. Accordingly after cam drive 33 is adjusted to provide the desired minimum clearance with the wall surfaces of groove 32 it may be locked in this position. In this manner backlash is reduced to an absolute minimum.

In addition to reducing backlash to a minimum the rotary-to-liner translator 25 described above provides several other advantages over the usual screw and nut arrangements known in the art. The cam arrangement of cam groove 32 and cam driver 33 eliminates the need for perfect linear and concentric alignment of the spool 12 and input shaft 26 and thus makes possible manufacturing economies. By changing the pitch of the cam groove angle, the gain relationship between the rotary input shaft 26 and the linear displacement of spool 12 may be altered. Thus several cam members 30 may advantageously be manufactured with various angles to provide various gain relationships and a particular member 30 installed in the valve to meet a specific requirement. In this manner, a desired output flow versus input shaft rotation may be advantageously selected.

Another aspect of the present invention is directed to the universal coupler 27 which couples feedback shaft 28 to spool 12 to permit the rotary motion applied to feedback shaft 28 to be translated into linear movement of spool 12 by rotary-to-linear translator 25 at the input shaft end of the valve. As shown in the drawing, coupler 27 includes a disk shaped member 40 having a center post 41 and a post 42 near the periphery extending therefrom. Member 40 is split as shown in FIG. 2 and is clamped to the left-hand end of spool 12 by cap screw 43 as shown.

The right-hand end of feedback shaft 28 terminates in a disk shaped member 44 as shown. Member 44 contains a notch 45 adapted to receive post 42 when coupler 27 is assembled and installed in valve body 10 as shown in FIG. 1. The end of feedback shaft 28 terminating in disk member 44 has a drilled hole 46 therein which is adapted to receive antibacklash spring 47 as shown. Feedback shaft 28 is installed in bearings 48 and 49 in end member 50 and retained therein by clip 51. End member 50 with assembled bearings 48 and 49 and feedback shaft 28 is secured to valve body 10 as shown in FIG. 1 by suitable machine screws.

As is well known linear movement of spool 12 of only a few thousands of an inch is all that is required to control the flow of pressurized fluid through control ports 19 or 20 to control the mechanism connected thereto. Accordingly only a partial revolution of input shaft 26 is required for translation into the required linear movement of spool 12. When shaft 26 is rotated cam driver 33 cooperates with the sidewalls of groove 32 in member 30 and will cause a linear movement of spool 12. As spool 12 moves linearly (to the right as shown in FIG. 1, for example) disk members 44 and 40 of coupler 27 move apart. They are free to do so because rod 42 is free to slide in notch 45 of disk 44. Similarly when input shaft 26 is rotated in the opposite direction the action of cam driver 33 against the sidewalls of cam groove 32 will move spool 12 in the opposite direction and disk members 40 and 44 of coupler 27 will move closer together. Rotary motion applied to feedback shaft 28 will cause the rotation of disk member 44. As disk member 44 rotates the sides of notch 45 will apply a force to post 42 which in turn will cause disk member 40 to rotate. This rotation of member 40 will cause the rotation of spool 12 in sleeve 24. The rotation of spool 12 will in turn cause the rotation by cylindrical member 30 in the rotary-to-linear translator 25. Because cam driver 33 protruding from cupped shaped member 34 is fixed in a linear position, the rotation of spool 12 will cause cam driver 33 to operate against the cam surface sidewalls of groove 32 and change the linear position of spool 12. Thus coupler 27 transmits the rotary motion of feedback shaft 28 to spool 12 and concomitantly accepts linear movement of spool 12. Coupler 27 also provides an additional important advantage in that limited angular misalignments and eccentricities of the feedback shaft 28 and spool 12 can be tolerated without effecting the performance of the valve and accordingly manufacturing tolerances are less stringent.

To insure that wear of the mechanical components does not result in backlash which would be detrimental to the sensitivity of the valve, an antibacklash spring 47, in accordance with an aspect of the invention, is included in a drilled hole 46 of feedback shaft 28. Spring 47 is installed in the valve under both compression and torsion and extends from the bottom of hole 46 in input shaft 28 to center post 41 of coupler 27. Spring 47 is maintained in the "wound" condition by its ends being placed in small holes, one in the bottom of hole 46 and the other in disk member 40 as shown in FIG. 1. Accordingly spring 47 operates both in the torsional mode as well as the linear mode to compensate for any wear that might occur in coupler 27 or translator 25. Spring 47 applies a linear bias force to spool 12 to cause cam driver 33 to be biased against one sidewall surface of groove 32. Accordingly should wear of the cam surfaces of groove 32 or cam driver 33 occur this linear force will bias spool 12 to the same repeatable position.

Similarly spring 47 applies a torsional or rotary bias force to disk member 44 so that one side of notch 45 will be biased against post 42 which protrudes from member 40. If wear in coupler 25 occurs the torsional force will bias the coupler 25 to the same repeatable position.

Antibacklash spring 47 aids in maintaining maximum valve sensitivity around null. Bernoulli forces resulting from hydraulic flow through work chambers 17 and 18 tend to center spool 12. This centering force reacts with the spring bias force supplied by antibacklash spring 47 so that a balance occurs at some flow point off null. Therefore, at null when the valve is demanding zero flow the condition of zero deadband is present.

Assume for example that control ports 19 and 20 are connected to a hydraulic motor (not shown) which provides a rotary drive and that rotary motion is fed back to feedback shaft 28 of the valve. Because only limited translation need exist between input shaft 26 and feedback shaft 28, for example ±60° and because flow through control ports 19 and 20 is produced in response to rotary movement of input shaft 26 the direction and speed of rotation of the controlled hydraulic motor is controlled by the input shaft with rotating movement also fed back to feedback shaft 28. The difference in the angle of input shaft 26 and feedback shaft 28 represents the flow of the valve output through control port 19 or 20, and in turn controls the rotational speed of the connected hydraulic motor. For example, for a constant shaft speed of the hydraulic motor the difference angle between the input shaft 26 and feedback shaft 28 would be held constant. To increase the r.p.m. of the connected hydraulic motor it is only necessary to increase the difference angle. For a null position, with zero flow out of the valve and consequently zero r.p.m. of the connected hydraulic motor, the difference angle between input shaft 26 and feedback 28 shaft is zero.

It is to be understood that the above-described embodiment is illustrative only of the principles of the present invention. Numerous other arrangements may be devised by those skilled in the art without departing from the spirit and scope of the invention.

What is claimed is:

1. A servo valve comprising
a four-way spool valve,
a rotary input shaft,
a rotary feedback shaft,
a rotary-to-linear translator
coupling said input shaft to the spool of said valve
for translating the rotary movement of said input shaft
into linear movement of said spool, said translator comprising
   a cam attached to said spool, said cam comprising
      a cylindrical member attached to said spool and
      a U-shaped helical groove extending around a portion of the cylindrical surface of said member with the sidewalls of said groove forming cam surfaces,
   a cam driver attached to said said input shaft, said cam driver comprising an elliptically shaped pin extending into said groove and adjustably rototable therein to provide minimum clearance between said pin and said sidewalls of said groove,
said cam and said cam driver operative to move said spool linearly in said valve in response to rotary movement of said input shaft and
means for coupling the rotary movement of said feedback shaft to said translator for translation into linear movement of said spool.

2. A servo valve comprising
a four-way spool valve,
a rotary input shaft,
a rotary feedback shaft,
means for translating the rotary movement of said input
shaft into linear movement of the spool of said valve, and
a universal coupler connected between said feedback shaft and said spool for coupling the rotary movement of said feedback shaft to said translating means for translation into linear movement of said spool,
said universal coupler comprising a first member attached to said feedback shaft,
said first member having an opening therein,
a second member attached to said spool and juxtaposed said first member, and
a post protruding from said second member and slidably positioned in said opening of said first member as the distance between said members varies in response to linear movement of said spool,
said members being operative to rotate said spool in response to rotary movement of said feedback shaft.

3. A servo valve comprising
a rotary input shaft,
a rotary feedback shaft,
a rotary to linear translator coupling said input shaft to the spool of said valve for translating rotary movement of said input shaft into linear movement of said spool,
a universal coupler connected between said feedback shaft and said spool for coupling the rotary movement of said feedback shaft to said translator for translation into linear movement of said spool and
antibacklash means operative to bias said translator and said coupler to predetermined positions,
said antibacklash means comprising a coil spring,
a first means for maintaining said spring under compression,
means including said spring and said first means for applying a linear bias force to said translator,
second means for maintaining said spring under torsion, and
means including said spring and said second means for applying a rotational bias force to said coupler.

4. A servo valve comprising
A four-way spool valve;
a rotary input shaft;
a rotary feedback shaft;
a rotary-to-linear translator coupling said input shaft and the spool of said valve comprising
a cylindrical member attached to said spool,
a U-shaped helical groove extending around a portion of the cylindrical surface of said member, the sidewalls of said groove forming cam surfaces, and
a cam driver attached to said input shaft and extending into said groove and in contact with said cam surfaces, said cam surfaces and said driver operative to move said spool linearly in said valve in response to rotary movement of said input shaft;

a universal coupler connected between said feedback shaft and said spool comprising a first member attached to said feedback shaft, said first member having an opening therein, a second member attached to said spool, and a post protruding from said second member into slidable engagement with said first member in said opening so that said post maintains engagement with said first member as the distance between said members varies in response to linear movement of said spool, said first and second members operative to rotate said spool in response to rotary movement of said feedback shaft; and antibacklash means for applying a linear bias force to said translator and concomitantly a torsional bias force to said coupler.

5. The combination defined in claim 4 wherein said antibacklash means comprises a coil spring, means for maintaining said spring under compression and torsion, means including said spring for applying a linear bias force to said spool whereby one cam surface of said groove is biased against said cam driver, and means including said spring for applying a rotary bias force to said first member whereby one side of said opening is biased against said post protruding from said second member.

* * * * *